United States Patent [19]

Dostoomian et al.

[11] 4,225,230
[45] Sep. 30, 1980

[54] BAND-RATIO RADIOMETER

[75] Inventors: Ashod S. Dostoomian, Stoughton; Joseph S. Lord, Walpole, both of Mass.

[73] Assignee: Vanzetti Infrared & Computer Systems Incorporated, Canton, Mass.

[21] Appl. No.: 930,268

[22] Filed: Aug. 2, 1978

[51] Int. Cl.³ .............................................. G01J 5/60
[52] U.S. Cl. .................................... 356/45; 356/407; 250/227
[58] Field of Search .................. 356/45, 407; 250/227

[56] References Cited

U.S. PATENT DOCUMENTS

| 3,327,712 | 6/1967 | Kaufman et al. | 350/96.26 |
| 3,795,918 | 3/1974 | Sunderland | 356/45 |

FOREIGN PATENT DOCUMENTS 312152 10/1971 U.S.S.R. ..................................... 356/45

Primary Examiner—Vincent P. McGraw
Attorney, Agent, or Firm—Sughrue, Rothwell, Mion, Zinn and Macpeak

[57] ABSTRACT

A band-ratio radiometer is disclosed which makes use of either a bifurcated or trifurcated fiber optic bundle, over two branches of which the sample radiation is transmitted in different wavelength regions. The third branch may be used to provide illumination of the target area, for aiming purposes, by injecting light at the near end of this branch. By this means, the remote ends of all three bundles may be focussed precisely upon the target area, with no parallax problem. The system avoids the use of conventional optical filters by making use of detectors which are identical in wavelength sensitivity and optical fibers which differ in wavelength transmittance.

2 Claims, 4 Drawing Figures

BAND-RATIO RADIOMETER

BACKGROUND OF THE INVENTION

The present invention relates to the field of optical radiometry. Optical radiometry is the science of measuring the surface temperatures of bodies by means of the optical radiation which they emit. The word "optical" refers to electromagnetic radiation covering the spectrum from gamma rays and X-rays through the ultraviolet, visible and infrared regions, ending at a wavelength of about 1 mm where radio wavelengths begin.

In connection with temperature measurements, the word "pyrometry" is often applied to that branch of radiometry which deals with hot or incandescent surfaces. "Optical pyrometry" (or "brightness pyrometry") makes use of visible light to measure incandescent body temperatures, while "radiation pyrometry" describes the same process but using infrared radiation. The term "radiometry" is broader than these, for it includes measurements of cold bodies.

Many optical pyrometers have been devised which measure visible light simultaneously in two wavelength regions. Use is made of the ratio of light intensities in order to overcome certain problems in the use of a single wavelength region. Such devices are called "two-color pyrometers" or "ratio pyrometers."

The ratio method may equally well be used with cooler objects, making use of two wavelength bands in the infrared region. In this case, the method is referred to as "two-wavelength radiometry" although the term "two-color radiometry" is often used. Other terms are also encountered which describe the above methods. Examples of these are "dual-wavelength," "two-band," "multi-spectral," "dichromatic" and "spectral radiance ratio" which are used with either "radiometry" or "pyrometry."

Ratio-radiometry has been in use for many decades as an extension of the basic radiometric method of temperature measurement. Its purpose is primarily to eliminate the effects of target surface emissivity by assuming that it is the same in both wavelength regions which are being sampled. Also, the method is able to compensate for any difference in emissivities, provided that the ratio of these is known and remains constant during the measurement.

The subjects of optical and two-wavelength radiometry have been described very fully in the prior literature, examples being the technical papers by Hornbeck, "Optical Methods of Temperature Measurement," *Applied Optics,* Volume 5, No. 2, February 1966, pages 179-186, and also by Horman, "Temperature Analysis from Multispectral Infrared Data," *Applied Optics,* Volume 15, No. 9, September 1976, pages 2099-2104. Therefore, these subjects are only briefly discussed herein.

The process of radiant emission from a theoretically perfect emitting surface (a blackbody) is described by Planck's Radiation Law, $$J_\lambda = c_1 \lambda^{-5}(e^{c_2/\lambda T} - 1)^{-1} \qquad (1)$$

where
$J_\lambda$ = radiant intensity at wavelength $\lambda$ (watts/cm$^3$)
$c_1 = 3.7 \times 10^{-12}$ (watts $\times$ cm$^2$)
$c_2 = 1.43$ (cm $\times$ deg)
$\lambda$ = wavelength (cm)
$e = 2.718$ (dimensionless)
T = absolute temperature (deg. K).

For the temperature and wavelength ranges in which we will be interested, the exponential term in parentheses is sufficiently greater than unity that Equation (1) may be written:

$$J_\lambda = c_1 \lambda^{-5}/e^{c_2/\lambda T} \qquad (2)$$

For a non-blackbody surface, we introduce an emissivity value, $E_\lambda$, which reduces the emission by a given amount at each wavelength:

$$J_\lambda = E_\lambda c_1 \lambda^{-5}/e^{c_2/\lambda T} \qquad (3)$$

Most often, the emissivity will vary with wavelength throughout the spectral region of interest. If it is relatively constant over some region, the surface is referred to as a greybody over that region. The emissivity of a surface may also vary with surface texture and with viewing angle, and frequently (as with metals) it will change as the surface temperature changes.

Assuming, however, that an emissivity $E_1$ characterizes a surface over some wavelength band centered on wavelength $\lambda_1$ and that $E_2$ is the corresponding value at $\lambda_2$, we may write for the radiant intensities in the respective bands:

$$J_1 = E_1 c_1 \lambda_1^{-5}/e^{c_2/\lambda_1 T}$$

and $$J_2 = E_2 c_1 \lambda_2^{-5}/e^{c_2/\lambda_2 T}$$

of which the ratio can be reduced to:

$$J_1/J_2 = (E_1/E_2)(\lambda_2/\lambda_1)^5 e^{(c_2/T)(1/\lambda_2 - 1/\lambda_1)}$$

The quantities $\lambda_1$ and $\lambda_2$ are known and are constant as is $c_2$. We make the same assumption for $E_1$ and $E_2$ and can hence replace them by new constants for brevity:

$$J_1/J_2 = Ae^{B/T}$$

Taking logarithms of both sides, we have:

$$\log_e(J_1/J_2) = (\log A) + B/T$$

or $$T = B/\log_e(J_1/AJ_2) \qquad (4)$$

where $$A = (E_1/E_2)(\lambda_2/\lambda_1)^5$$

and $$B = c_2(1/\lambda_2 - 1/\lambda_1)$$

Equation (4) is the "working equation" of ratio pyrometry, just as Equation (3) is for "monochromatic" pyrometry, the difference being that the latter contains E explicitly. However, the user should be aware that in the former case, although $E_1$ and $E_2$ are allowed to vary throughout the course of the measurements, their ratio must remain constant.

In principle, one has only to measure the respective radiant intensities in the two wavelength bands, over some defined part of the target surface, in order to be able to deduce the temperature at this region. If the wavelength bands are not widely separated in the spectrum, one can safely assume that $E_1/E_2 = 1$, unless one has prior knowledge to the contrary.

In practice, there are two basic ways of implementing the measurement, each with its advantages and disadvantages. Either a simultaneous measurement may be made by two detector/filter combinations, or a single detector may be used to view the surface sequentially through alternating filters.

In the simultaneous method, care must be taken to ensure that the detector responses are similar or that any differences are calibrated out. The method offers the advantages that there are no moving mechanical parts and that the response time of the system is limited by that of the basic detection system rather than by "chopping frequency" considerations in connection with the motions of the filters. Although individual detectors are frequently chopped in order to eliminate thermal drift problems, this can be done at higher frequencies than one can use in filter alternation.

The sequential method eliminates any uncertainties due to possible detector drift but may introduce questions of reliability if the rotating or oscillating filter system is not carefully designed and tested.

The second method is often used in mass-produced two-color pyrometers for use by semi-skilled personnel, where the design cost is easily amortized and where periodic calibration is not feasible.

For laboratory uses of band-ratio radiometry, the method is best implemented by use of a two-detector system, along with appropriate calibration procedures, and this is the approach taken in the present invention.

SUMMARY OF THE INVENTION

The present invention differs from previous ratio-radiometers in that it uses two different materials, having different spectral transmittance properties, in a bifurcated or trifurcated fiber optical radiation guide to achieve the same effect as conventional optical filters. This is a considerable advantage because it is not always convenient or economical to provide the desired optical filters, particularly in the near-infrared region from about 1-3 micrometers. Moreover, the use of the fibers to perform the filtering function permits a closer placement of the fiber bundle end faces to their respective detectors. This would not be the case if filters were interposed between the end faces and the detectors. The close placement avoids the spreading loss of radiation which would occur in the intervening space if filters were used. Such losses ordinarily occur because the radiation emerging from most optical fibers is spread into rather large angles (typically, 50 or 60 degrees) compared with other optical elements, such as lenses.

Another feature of the invention is the use of two identical detectors in the separate branches of the optical fiber bundle. The use of identical detectors is desirable on the basis that their physical and electrical properties can be matched. Problems are thereby avoided concerning unequal detector sizes, sensitivities, response times, temperature characteristics, aging properties and so forth.

The use of the trifurcated fiber optical guide provides a third optical branch which is used to convey an image of a luminous aperture to the target surface, in coincidence with the detector images, to be used for aiming or positioning purposes. A lens or other focusing system may be provided to allow the formation of an image of the remote or common end of optical fiber bundle onto a defined area of a target whose temperature is to be measured.

BRIEF DESCRIPTION OF THE DRAWINGS

A better understanding of the invention will be had from the following detailed description with reference to the accompanying drawings, in which.

DETAILED DESCRIPTION OF THE INVENTION

Figure 1:
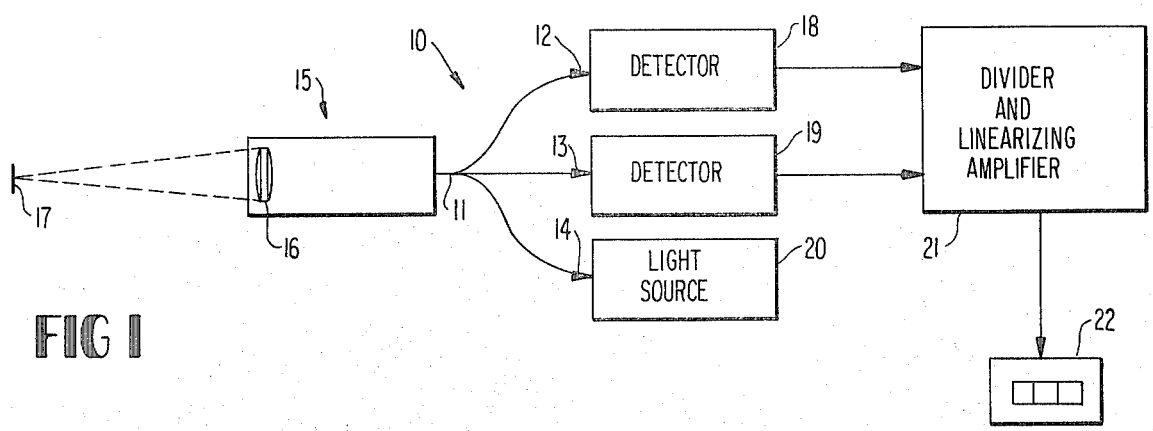
FIG. 1 is a block and schematic diagram of a preferred form of the band-ratio radiometer according to the invention.

Referring now to the drawings and, more particularly, to FIG. 1, there is shown a trifurcated optical fiber bundle 10 having a common end 11 and three branched ends 12, 13 and 14. The ends of the optical fibers of each branch are interspersed in the common end 11. A focusing system 15 comprising an objective lens 16 forms an image of the common end of the bundle onto a defined area of a target 17 whose temperature is to be measured. The branched ends 12 and 13 are immediately proximate respective detectors 18 and 19, while the branched end 14 is adjacent a light source 20. Detectors 18 and 19 are connected to the inputs of conventional divider and linearizing amplifier circuitry 21, the output of which may be displayed by a meter 22.

Each fiber optical bundle forming a branch of the trifurcated bundle is composed of a group of continuous, hair-like strands of clear optical material, such as one of the many forms of glass. Each fiber has the ability to transmit optical radiation from one end to the other, even though the fiber is bent. The properties of such fibers are well known in the art and have been widely documented. An example is the technical paper by Kapany, entitled "Fiber Optics," *Scientific American*, Volume 203, No. 5, November 1960, pages 72–81.

The purpose of interspersing the fibers at the remote or common end is to achieve spatial coincidence of the images of the two detectors 18 and 19 and the light source 20 at this end. Each "image" in this case is composed of the scrambled pictorial elements of whatever object the other ends of the fibers are aimed at. The remote end of the bundle, therefore, carries scrambled image elements from both detectors and from the light source. When this end is in turn re-imaged onto a defined portion of a target surface by the lens 16, for example, the detectors and light source are all ensured of being imaged onto that same portion.

In this way, we avoid the problem of parallax error which arises when two detectors (and possibly an aiming device) are separately directed toward and focused upon a specific target area. In such a case, if a new target distance is to be used, all three devices must be re-directed as well as re-focused. In the present invention, only one lens need be re-focused for a new target distance.

Those who are familiar with fiber optics will recognize that it is not possible to achieve perfect scrambling of the separate images at the remote end of the bundle. Part of the reason is that the mixing of the fiber ends is done manually during manufacture and it is difficult to avoid random local clusters of fibers from the same branch. Besides this, even if the mixing were uniform, the individual fiber ends are finite in size and, therefore, the image as projected onto the target possesses a "microstructure" or graininess.

For situations where this may be a problem, the solution is offered by the use of an "optical mixer" or "homogenizer" in the form of a short length of transparent rod whose walls and ends are optically polished. Its diameter is approximately that of the fiber bundle end face and its length may be equal to several times its diameter. For use with infrared-transmitting fibers, such a rod may be made of sapphire, quartz, ruby or other infrared-transmitting materials which are known in the art.

Such a rod thus serves as a large diameter single fiber. Radiation is transmitted from end to end largely by internal reflection from the side walls, the more so if the rod is longer. By this means, better mixing of the ray paths from the individual fibers is ensured. In use, the rod is placed in contact with, or in proximity to, the remote end face of the fiber bundle. Its other end is then to be focused onto the defined target area.

Turning now to the subject of the radiation detectors themselves, a variety of such detectors is known to practitioners of the optical detection art, with various physical properties involving spectral sensitivity, radiant sensitivity, response time, noise level, ambient temperature sensitivity, etc. Among these, we are primarily interested in the spectral properties for purposes of this discussion. Besides the well-known vacuum and gas-filled diodes and the photomultipliers which are sensitive to ultraviolet and to visible light, there are many other detectors which are light and/or infrared sensitive. They are most often "solid-state" devices whose properties depend upon the choice of material from which they are made. Among the materials are cadmium sulfide and cadmium selenide for visible light and near-infrared, silicon, germanium and lead sulfide for longer-wave infrared, lead selenide, indium antimonide, gold-doped germanium and others whose spectral sensitivities extend increasingly further into the infrared. (The lower the target temperature, the greater the wavelength to which the detector must respond.)

Besides these, there is the traditional thermocouple detector in its various forms as well as diverse thermistor detectors and the newer pyroelectric detectors, the latter of which generate a voltage in response to a change in temperature.

Figure 2:
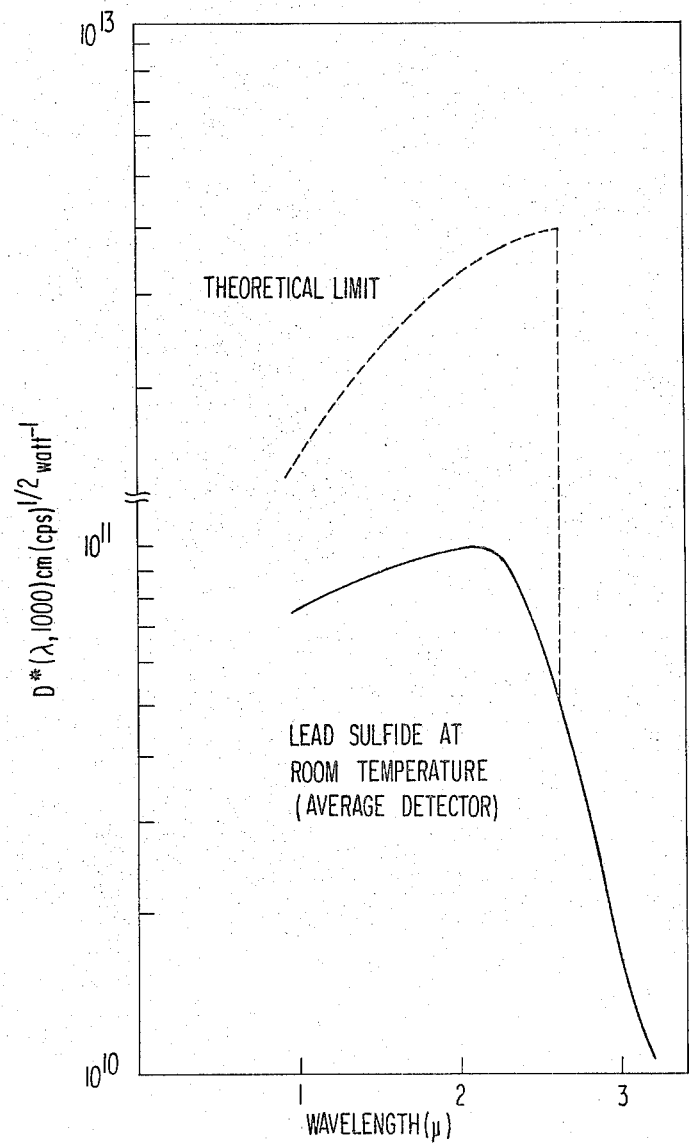
FIG. 2 is a graph showing the spectral response of lead sulfide detectors at room temperature.
Figure 3:
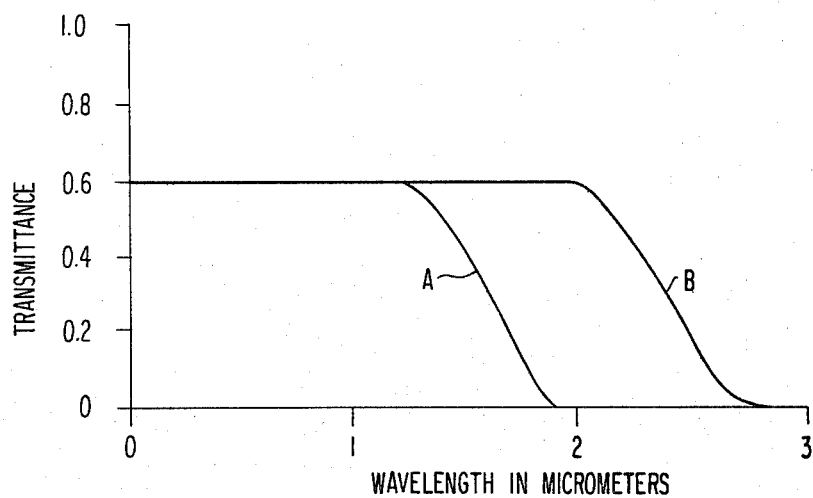
FIG. 3 is a graph showing the ideal spectral transmittance curves of two types of glass which may be used in making the bifurcated or trifurcated optical fiber bundle used in the invention.
Figure 4:
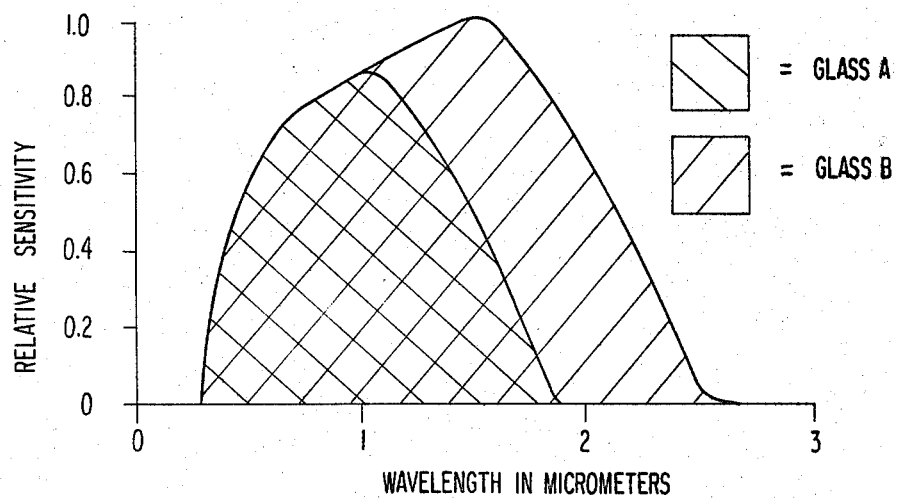
FIG. 4 is a graph showing the effective spectral sensitivities of lead sulfide when used with the glasses represented by the curves in FIG. 3.

A particular feature of our invention is that identical detector types are used, and the optical filters are eliminated by making the branched bundles leading to the detectors of suitably different optical glass. An example is given of the case of a lead sulfide detector whose spectral sensitivity at room temperature is illustrated in FIG. 2. The spectral transmittances of two representative types of glass, borosilicate glass A and quartz B, are shown in FIG. 3. When the lead sulfide detector is used with each of these glasses in turn, its spectral response is defined by the respective curves in FIG. 4.

We note that these curves have an overlapping area and do not occupy separate wavelength intervals, as is generally the case in two-wavelength radiometry. However, the theory of operation is nevertheless applicable, in an approximate way. One need only think of each of the curves as being replaced by a narrow spectral line at its centroid, and these lines identify, approximately, the two effective wavelengths of the system.

We consider, now, the case where the third fiber bundle is used for illuminating the target area in order to facilitate the aiming of the optical probe. It often happens that the illumination source which is used contains sufficient infrared radiation, within the spectral range of the detectors, to cause a "background level" which is superposed on any thermal signal from the target. In such a case, it is common practice to use the illumination source for initial positioning of the probe and then to turn it off when the actual measurements are being made.

In many cases, it would be desirable to leave the illumination source on during the measurements in order to ascertain that the probe was still in its proper position. For such cases, our solution is to make use of "cold light," from which the infrared content has been removed by optical filtering, and also to suppress any visible light response of the detectors by further optical filtering. The use of infrared-absorbing, visible light-transmitting filters is known in the art. These are typically either absorption-type or interference-type filters, often referred to as "heat absorbing" filters, which are used in slide projectors and the like. It is merely necessary to insert one of these anywhere in the optical path between the light source 20 and the remote or common end 11 of the illumination branch of the fiber bundle in order to achieve an aiming spot with minimal infrared content.

At the same time, the visible light response of the detectors may be suppressed by use of any of a variety of infrared-transmitting, visible, light-absorbing filters which are known to optical practitioners. Similarly, these may be introduced anywhere in the receiver optical path. In making the selection of both the above types of filters, care must be taken to ensure that their respective transmittance regions do not overlap.

What is claimed is:

1. A band-ratio radiometer for simultaneously measuring optical radiation in two wavelength regions, comprising:
    a fiber optic bundle having first and second branches joined at one end to form a common end, the fiber ends of each branch being interspersed in said common end, and the optical fibers of said first branch having a different wavelength transmittance than that of the optical fibers of said second branch;
    first and second detectors proximate to the branch ends of said first and second branches respectively of the fiber optic bundle;
    means connected to said first and second detectors for generating an output proportional to the ratio of the outputs of said first and second detectors;
    means for imaging said common end of the fiber optic bundle on a target, the radiation of which is to be measured; and
    a third branch joined with said at least two branches at said common end, the fiber ends of said third branch being interspersed in said common end with the fiber ends of said at least two branches, said radiometer further comprising a light source proximate to the branch end of said third branch so that the light from said light source is projected on a target whereby imaging of said common end on the target can be accomplished without parallax.

2. A band-ratio radiometer as recited in claim 1 wherein the optical fibers of said first and second branches are respectively composed of borosilicate glass and quartz, and said first and second detectors are lead sulfide detectors.

* * * * *